United States Patent [19]
Mauck

[11] 3,856,168
[45] Dec. 24, 1974

[54] BOAT TRAILER CONSTRUCTION
[75] Inventor: Robert J. Mauck, Pinconning, Mich.
[73] Assignee: John J. Buta, Deerand, Mich.
[22] Filed: May 3, 1973
[21] Appl. No.: 356,927

[52] U.S. Cl. .............................. 214/505, 214/83.24
[51] Int. Cl. .............................................. B60p 3/10
[58] Field of Search .......... 214/83.24, 505, 506, 84, 214/516; 280/414 R

[56] References Cited
UNITED STATES PATENTS
| | | | |
|---|---|---|---|
| 2,716,499 | 8/1955 | Grant | 214/84 |
| 3,067,892 | 12/1962 | Barrett et al. | 214/84 X |
| 3,584,753 | 6/1971 | Voeller | 214/505 |
| 3,717,268 | 2/1973 | Snodgrass | 214/83.24 |

Primary Examiner—Albert J. Makay
Attorney, Agent, or Firm—Frease & Bishop

[57] ABSTRACT

A boat trailer having a plurality of movable carriages to facilitate launching, loading and storing of a boat. The trailer has a pair of parallel spaced inner channels and a similar pair of outer channels which extend longitudinally along the trailer frame. The carriages are interconnected by chains and are roller supported by a plurality of rollers for movement along the channels by a winch mounted on the trailer front end. The boat is supported and carried by the carriages which successively lift the boat out of the water as the carriages move forwardly along the channels and upwardly on ramps formed on the channels during loading, and vice versa during launching of a boat from the trailer.

9 Claims, 10 Drawing Figures

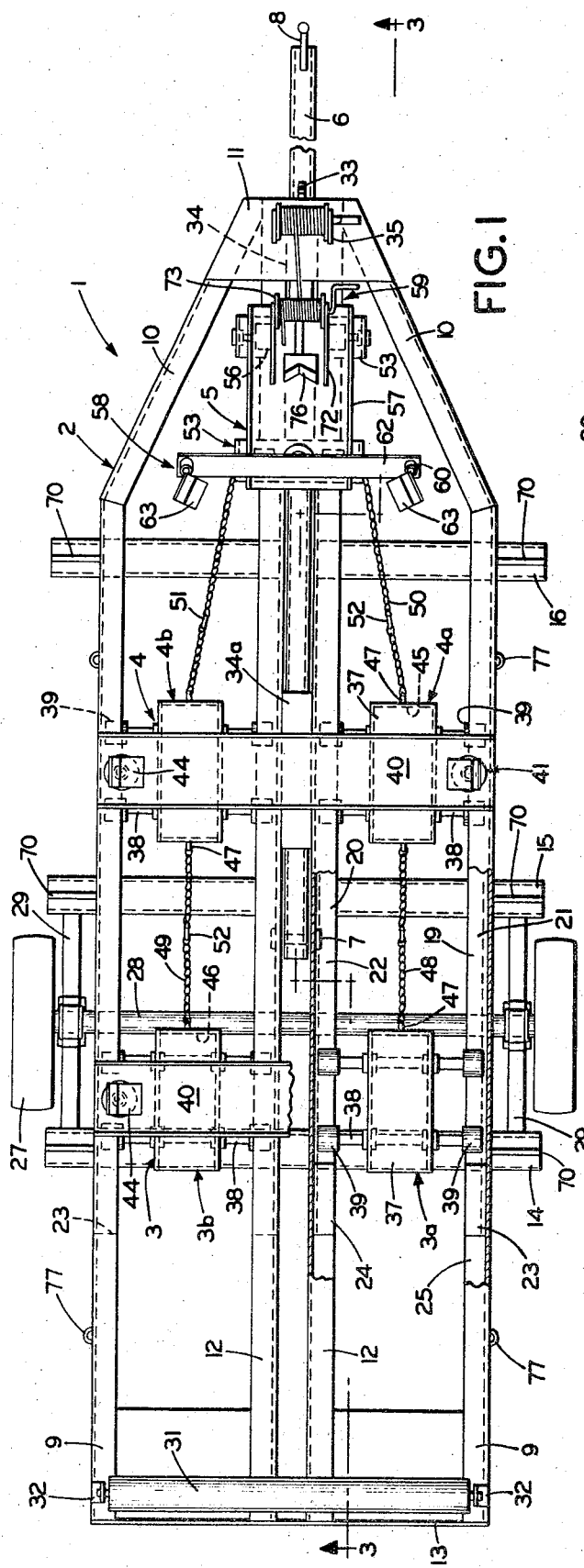
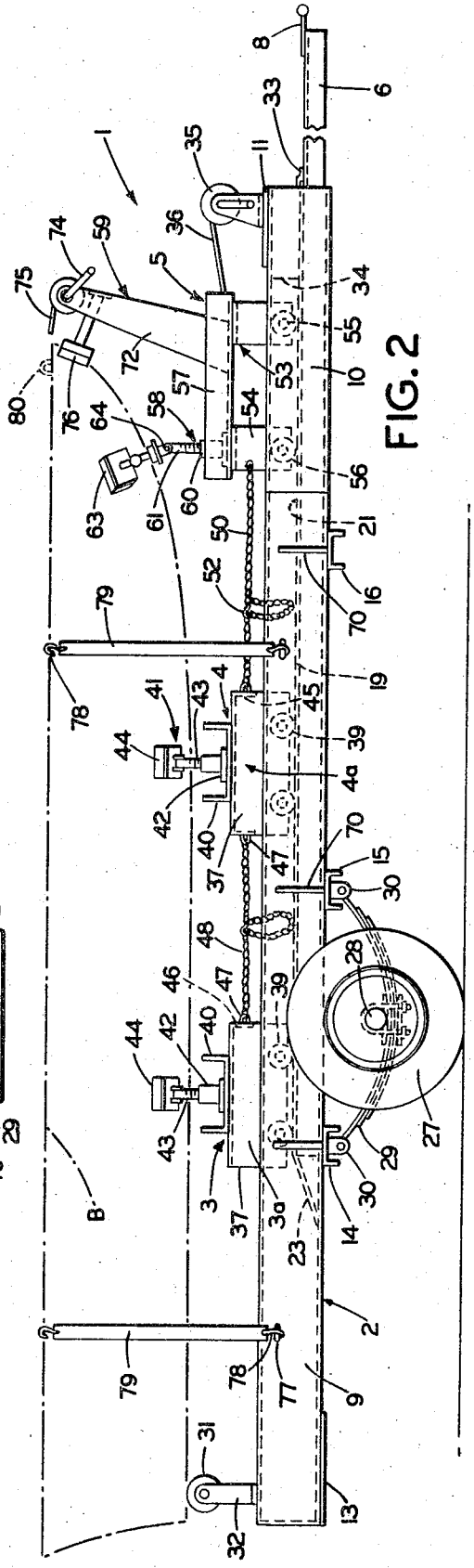
FIG. 1
FIG. 2

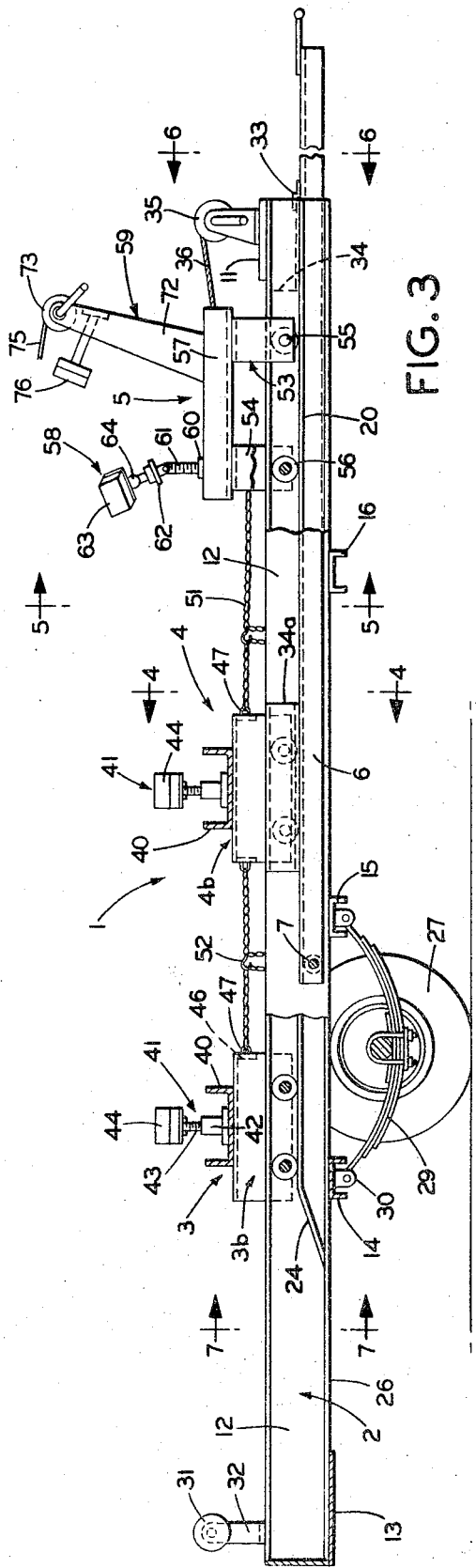

BOAT TRAILER CONSTRUCTION

BACKGROUND OF THE INVENTION

1. Field of the Invention

The invention relates to boat trailers and in particular to trailers having means permitting boats to be launched and loaded easily without excess contact on the hull of the boat. More particularly the invention relates to a boat trailer having a plurality of carriages movable along the trailer frame which lifts and lowers a boat out of and into the water with minimum sliding movement over stationary rollers which mar and scratch the hull.

Description of the Prior Art

There are numerous types of boat trailer constructions on which boats are moved between locations and which provide means for launching and loading the boats from and on the trailer. These trailers generally have a series of spaced rubber covered rollers mounted along the trailer frame. A winch at the front of the trailer pulls the boat out of the water and across the rollers to the forward end of the trailer where the boat is made secure, and vice versa when launching the boat.

This rolling movement of the boat across the trailer rollers in many instances will damage, mar and scrape the boat hull. However, unless the boat is lifted from and onto the trailer by a hydraulic lift mechanism adjacent the water edge, there is no other alternative.

Recently boat trailers have been constructed which attempt to eliminate much of this roller-boat hull engagement such as shown in U.S. Pat. Nos. 3,009,589, 3,097,755, 3,102,649, 3,127,041 and 3,167,198. Many of these constructions, however, require complicated and expensive structural mechanisms having numerous moving parts which require constant maintenance and still provide a trailer construction having considerable hull-roller contact during launching and loading of the boat.

U.S. Pat. Nos. 2,830,717 and 3,656,639 eliminate some of this hull-roller sliding contact by providing a movable carriage which supports the bow of the boat to reduce roller contact therewith. These constructions, however, still require a large portion of the boat's weight to be supported by and dragged across stationary rollers mounted on the trailer frame. Another recent U.S. Pat. No. 3,438,524 nearly eliminates all such roller-hull engagement by providing a series of dollies which move along a longitudinally extending central frame channel member with the bow of the boat being supported by a dolly having rollers mounted thereon. This construction appears to reduce the hull-roller engagement problem, but may present stability problems of the boat during transit since the boat hull is supported throughout only a small area adjacent the boat keel.

Accordingly, a need has existed for an improved boat trailer construction which reduces sliding movement of the boat's hull across stationary rollers mounted on the trailer frame and which provides a highly stable and rigid structure for supporting the boat during movement between locations.

SUMMARY OF THE INVENTION

Objectives of the invention include providing an improved boat trailer construction which greatly reduces possible damage to the hull of the boat during loading and unloading by reducing the amount of sliding movement between the boat hull and stationary rollers mounted on the trailer frame; providing a trailer construction which provides a plurality of boat supporting carriages which move on rollers in a longitudinal direction along the trailer frame which "lift" the boat from the water during loading and which "lay" the boat into the water during launching, thereby eliminating abrasive forces acting on the boat's hull by components of the trailer such as rollers, etc.; providing a trailer construction in which the majority of the boat's weight is supported by a pair of carriages which extend transversely across the trailer frame, which carriages are provided with a plurality of spaced rollers to provide rigid and stable supports for the boat during launching, loading and transit; providing a boat trailer construction in which upwardly, forwardly, sloping ramps are formed on the trailer frame whereby the carriages firmly engage and disengage the boat's hull eliminating sliding movement therebetween, reducing the possibility of damage to the hull; providing a trailer construction in which the separation between the supporting carriages are readily adjustable to permit positive engagement and disengagement with boat hulls of varying lengths and configurations; providing a trailer in which the drawbar is pivotally mounted on the trailer frame enabling the trailer to adjust to the slopes of various boat launching ramps, in which the drawbar is self-aligning eliminating side sway of the trailer frame with respect to the drawbar, and in which the drawbar has positive alignment with respect to the trailer frame when the trailer frame is pivoted to usual latched condition for transit; and providing a boat trailer construction having a rigid and durable frame configuration which reduces considerably the number of moving parts and maintenance required therefor, and which eliminates difficulties heretofore encountered, achieves the stated objectives simply and effectively, and solves problems and satisfies existing needs.

These objectives and advantages are obtained by the improved boat trailer construction, the general nature of which may be stated as including frame means; a pair of spaced wheels mounted on the frame means for movement of the trailer along the ground; a drawbar pivotally mounted on the frame means and extending longitudinally forwardly from the frame means; hitch means mounted on the drawbar for attaching the drawbar to a towing vehicle; the frame means including a pair of spaced, parallel, longitudinally extending outer channel members, and a pair of spaced, parallel, longitudinally extending inner channel members, the inner channel members being parallel with the outer channel members; ramp means formed on the outer and inner channel members; the ramp means being formed in the rear end portions of the channel members and aligning transversely with respect to each other; first carriage means mounted on the inner pair of channel members including boat receiving cradle means, first winch means for drawing a boat onto the cradle means, and a plurality of rollers mounted on the first carriage means for movement of the carriage means along the inner channel members; at least second carriage means movably mounted on the inner and outer pairs of channel members; the second carriage means including pad means for supporting a boat, and a plurality of rollers mounted on the second carriage means engageable with the inner and outer channel members for moving the second carriage means along the channel members; chain means extending between the first and second carriage means; and second winch means mounted on the frame means operatively connected to the first carriage means for moving all of the carriage means forwardly along the frame means by successively tensioning the chain means between the carriage means whereby the carriage means successively engage the hull of a boat floating in the water and lift the boat upon movement of the carriage means upwardly along the ramp means.

BRIEF DESCRIPTION OF THE DRAWINGS

A preferred embodiment of the invention — illustrative of the best mode in which applicant has contemplated applying the principles — is set forth in the following description and shown in the drawings, and is particularly and distinctly pointed out and set forth in the appended claims.

FIG. 1 is a top plan view of the improved boat trailer construction, with portions broken away and in section;

FIG. 2 is a side elevation of the trailer construction shown in FIG. 1, with the outline of a boat shown in dot-dash lines being mounted thereon;

FIG. 3 is a longitudinal sectional view taken on line 3—3, FIG. 1, with portions broken away;

FIG. 4 is a fragmentary sectional view taken on line 4—4, FIG. 3, with portions broken away;

FIG. 5 is a fragmentary sectional view taken on line 5—5, FIG. 3;

FIG. 6 is a fragmentary sectional view taken on line 6—6, FIG. 3;

FIG. 7 is a fragmentary sectional view taken on line 7—7, FIG. 3; and

Similar numerals refer to similar parts throughout the drawings.

DESCRIPTION OF THE PREFERRED EMBODIMENT

Figure 8:
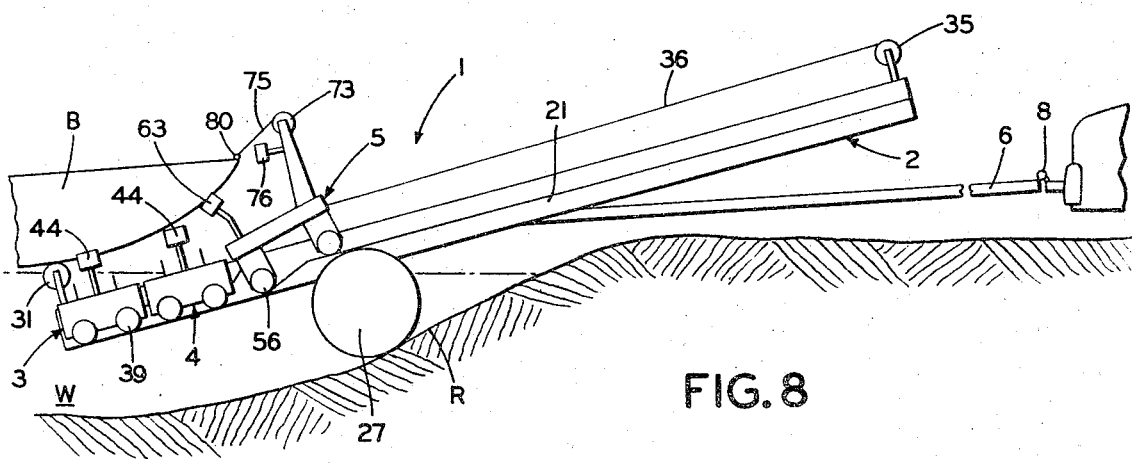
FIGS. 8–10 are general diagrammatic sequential views showing a boat being loaded on the improved trailer construction.

The improved boat trailer construction is generally indicated at 1 (FIGS. 1, 2 and 3) and includes a frame 2 having a plurality of carriages 3, 4 and 5 movably mounted thereon. A drawbar 6 is pivotally mounted on frame 2 by pin 7 and has a hitch 8 at the outer end for attachment to a usual towing vehicle.

Frame 2 has a pair of spaced, parallel, longitudinally extending outer members 9, the front end portions 10 of which merge into a generally pointed configuration having a connecting end plate 11. A pair of inner members 12 extend parallel with outer members 9 and terminate at end plate 11. The rear ends of members 9 and 12 are rigidly connected by an L-shaped reinforcing end plate 13 which is attached to members 9 and 12 by welds, bolts or other fastening means.

Reinforcing channels 14, 15 and 16 extend transversely across frame 2 and slightly beyond outer members 9. Gussets 70 (FIG. 5) are welded to members 9 and channels 14–16 to provide a rigid trailer frame construction. Reinforcing channel 14 is a continuous member, whereas channels 15 and 16 are in two sections being separated between inner members 12 to permit pivotal movement of drawbar 6 therebetween.

Members 9 and 12 preferably are formed by main channel-shaped members 17 and 18 having inner angle members 19 and 20, respectively, welded therein. The top legs 21 and 22 of inner angle members 19 and 20, respectively, form a track on which carriages 3 and 4 move along frame 2, with legs 22 of angle members 20 forming a track for carriage 5.

In accordance with the invention, ramps 23 and 24 (FIGS. 1–3) are formed on the rear portions of angle members 19 and 20, respectively. Ramps 23 and 24 extend forwardly upwardly from botton legs 25 and 26 of channels 17 and 18. Thus, channel bottom legs 25 and 26, ramps 23 and 24, and angle legs 21 and 22 form the frame tracks for the respective carriages 3–5, which tracks extend longitudinally along frame 2. Although members 9 and 12 are each shown and described as being formed by two separate members, they can be formed by single channel members having ramp formations without affecting the concept of the invention. This latter unitary channel formation, however, would be more expensive to fabricate than members 9 and 12 as shown.

Frame 2 is supported by a pair of spaced wheels 27 rotatably journaled on the ends of axle 28. Axle 28 is resiliently mounted on usual leaf springs 29 which are suspended beneath frame 2 on brackets 30 which are mounted on reinforcing channels 14 and 15.

A resiliently covered roll 31 extends transversely across the rear end of frame 2 and is spaced above frame 2 by spaced brackets 32 in which the ends of roll 31 are rotatably journaled.

Drawbar 6 preferably is a U-shaped channel (FIGS. 4 and 5) and extends longitudinally beneath frame 2 between inner frame members 12. Drawbar 6 is pivotally mounted at its rear end by pin 7 to members 12. A latch member 33 is pivotally mounted on drawbar 6 and is engageable with a longitudinal reinforcing tubular member 34 to latch drawbar 6 in towing position, as shown in FIGS. 1–3. Another tubular reinforcing member 34a, similar to member 34, is mounted between inner frame members 12 intermediate the ends of frame 2 (FIGS. 1, 3 and 4) to provide sufficient rigidity to frame 2.

A usual winch 35 is mounted on front end plate 11 and is operatively connected to the front or bow carriage 5 by cable 36 for movement of carriages 3, 4 and 5 longitudinally along frame 2.

Carriages 3 and 4 are similar in construction and therefore only intermediate carriage 4 is described in detail. In accordance with the invention carriage 4 includes a pair of subcarriages 4a and 4b mounted between the pairs of inner and outer frame members 12 and 9. Subcarriages 4a and 4b each include an upwardly extending section of channel 37 (FIG. 4) mounted on a pair of axles 38 which extends transversely between inner and outer members 12 and 9. Rollers 39 are rotatably journaled on the ends of axles 38 and engage angle legs 21 and 22 (FIG. 4) as well as the other portions of the trailer frame track when moving along frame 2.

A channel-shaped platform 40 is mounted on channels 37 of each subcarriage 4a and 4b and extends transversely across frame 2 (FIG. 1). A pair of adjustable boat support pad assemblies 41 is mounted at opposite ends on platform 40 of carriages 3 and 4. Support pads 41 may have a jack-like configuration with a base 42 formed with an internally threaded bore in which a threaded post 43 is adjustably engaged. A resiliently covered pad 44 is pivotally mounted on the top end of each post 43 and supports a boat B mounted thereon (FIGS. 2 and 4).

Plates 45 are welded to the front and rear ends of subcarriages 4a and 4b of intermediate carriage 4 (FIG. 4), and similar plates 46 are welded to the front ends of subcarriages 3a and 3b of rear carriage 3 (FIG. 7). U-bolts 47 are welded to plates 45 and 46 for connecting chains 48–51 thereto. Chains 48 and 49 extend between subcarriages 3a–4a and subcarriages 3b–4b, respectively, and chains 50 and 51 extend between subcarriages 4a–4b and front carriage 5.

Each one of chains 48–51 preferably includes a hook 52 connected to one of the intermediate chain links to provide means for easily adjusting the longitudinal spacing between the respective carriages.

Front or bow carriage 5 (FIG. 5) includes a pair of channel brackets 53, each leg 54 of which supports an inwardly extending stub shaft 55 having a roller 56 rotatably journaled on the end thereof. Rollers 56 engage angle legs 22, ramps 24 and legs 26 which form the frame track on inner frame members 12 to movably mount front carriage 5 on members 12.

Front carriage 5, thus is mounted for longitudinal movement along the tracks formed by inner members 12 on four rollers 56. Intermediate and rear carriages 4 and 3 are mounted for longitudinal movement along the frame tracks formed by both inner and outer pairs of frame members 12 and 9. Carriages 3 and 4 are supported each by eight rollers 39 providing strong, rigid and sturdy supports for a boat when supported thereon.

Front carriage 5 has a channel-like platform 57 mounted on brackets 53 and extends longitudinally therebetween. A cradle for supporting the bow of a boat is mounted on carriage 5 and includes an adjustable pad assembly 58 and a winch assembly 59. Pad assembly 58 has a base 60 and a post 61 which are similar to base 42 and post 43 of carriages 3 and 4. A transversely extending bar 62 is pivotally mounted on the top of post 61 and has a pair of spaced bow engaging pads 63 movably mounted by ball joint sockets 64 on the ends of bar 62.

Winch assembly 59 includes a pair of upwardly extending spaced plates 72 mounted on platform 57 with a winch 73 mounted on the top end thereof. Winch 73 may be of a usual construction having a crank handle 74 and a cable 75 for attachment to the bow of boat B. A pad 76 also is mounted on and extends rearwardly from plates 72 and together with pads 63 provide a three-point cushioned support for the boat bow.

A plurality of spaced brackets 77 (FIGS. 1 and 2) are mounted on the outer side surfaces of outer frame members 9 for engagement by hooks 78 on the ends of straps 79. The other ends of straps 79 connect to boat B when mounted on trailer 1 to provide positive means to hold boat B on trailer 1 during storage and transit. Straps 79 may be elastic type members of readily adjustable leather or canvas straps.

The operation of improved boat trailer 1 in removing a boat from the water is shown diagrammatically in FIGS. 8–10 and is described below. Trailer 1 is backed down a loading ramp R a sufficient distance into water W to be beneath the bow of boat B. Cable 75 of winch 73 is connected to bow hook 80 of boat B and cable 75 then is taken up on winch 73, drawing boat B forwardly in the water above carriages 3 and 4. The keel of boat B initially will move across and engage roll 31 at the rear of the boat, the amount of engagement being determined by the location of trailer 1 within water W. Cable 75 is taken up until the bow is supported snugly against pad 76 and partially between pads 63 of carriage 5, in which position winch 73 is locked by usual locking or retaining means.

Winch 35 then is operated to begin taking up cable 36 which is connected to the front end of carriage 5. Pads 63 of carriage 5 positively and firmly engage the hull of boat B by moving in an upward direction against the hull upon rear rollers 56 of carriage 5 moving up ramps 24. Carriage 5 continues to be drawn forwardly by cable 36 with the boat bow being supported by pads 63 and 76 of carriage 5 with the keel of boat B moving across roll 31 (FIG. 9).

Chains 50 and 51 become taut upon carriage 5 reaching a predetermined position, whereupon intermediate carriage 4 begins to move forwardly, being drawn by cable 36 through chains 50 and 51. Pads 44 of carriage 4 move upwardly and positively engage the hull of boat B upon carriage 4 moving up ramps 23 and 24, thereby imparting a "lifting" effect to boat B (FIG. 9).

Figure 9:
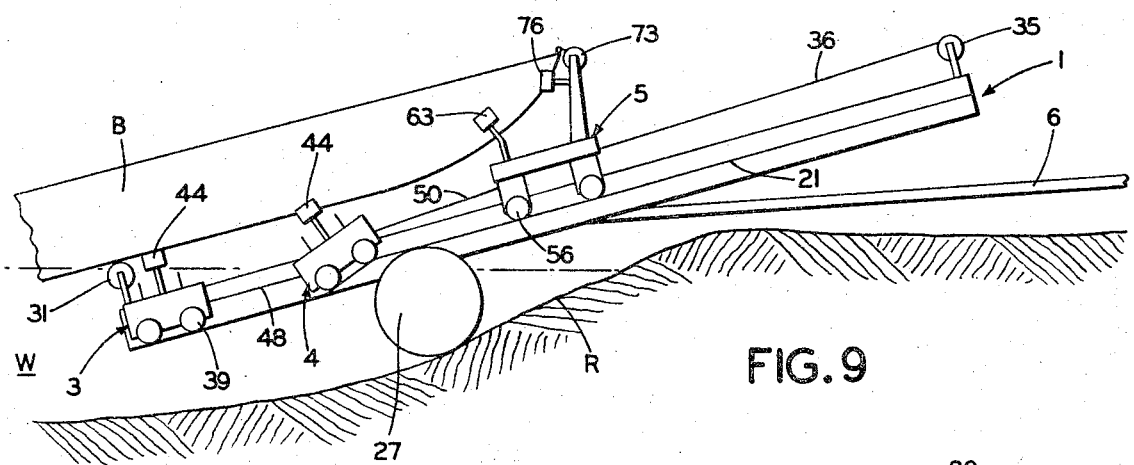

Boat B, in moving forwardly between the positions of FIG. 8 and FIG. 9, will be carried by carriages 4 and 5 with the boat stem being supported by the water and for a distance by roll 31. Rear carriage 3 will begin moving forwardly upon chains 48 and 49 becoming taut between carriages 3 and 4. Pads 44 of carriage 3 will lift the middle portion of boat B out of the water with a positive upward engagement with the boat hull as carriage 3 moves upwardly along ramps 23 and 24 of members 9 and 12, eliminating any sliding engagement between the hull and pads 44.

Figure 10:
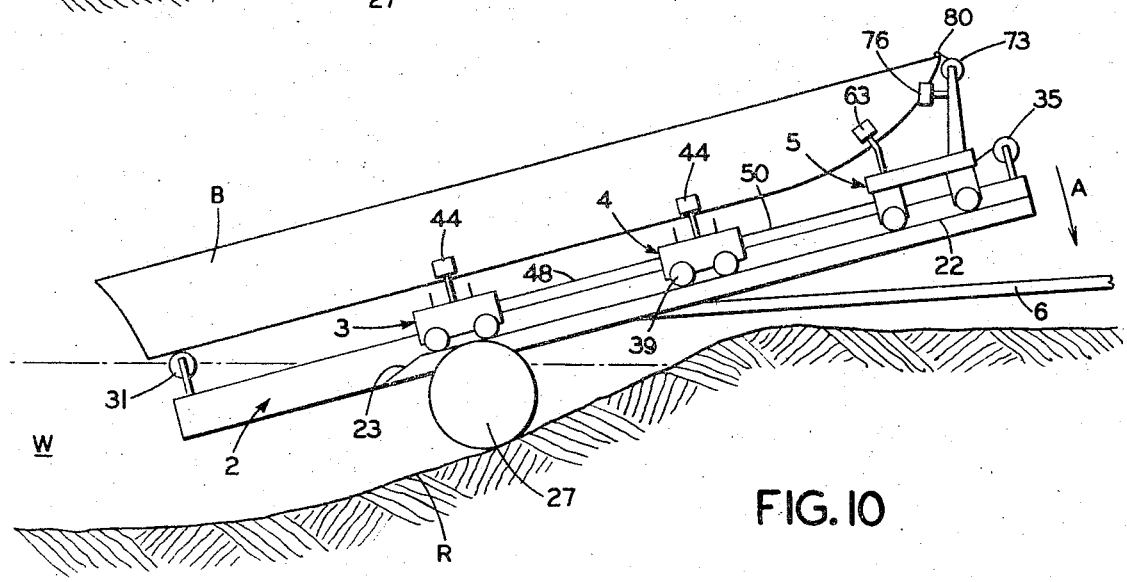

Carriages 3, 4 and 5 continue to carry boat B forwardly along frame 2 to the storage position of FIG. 10, at which position carriage 5 is at the front end of inner frame members 12 and adjacent to winch 35. The boat stern is supported by roll 31, with the majority of the boat's weight, however, being supported by carriages 3, 4 and 5.

The front end of trailer 1 then may be pivoted downwardly (arrow A, FIG. 10) about axle 28 and secured to drawbar 6 by latch 33. Frame 2 is moved downwardly easily since the center of gravity of boat B and frame 2 is forwardly of axle 28 as can be seen by viewing FIG. 10.

The launching of boat B from trailer 1 is merely the reverse procedure from the above-described loading procedure. The trailer 1 is backed down ramp R into the water a sufficient distance and latch 33 uncouples drawbar 6 from the front end of frame 2 whereupon the front end of frame 2 pivots upwardly in a direction opposite to that of arrow A in FIG. 10. Cable 36 is payed out from winch 35 whereby the weight of boat B moves carriages 3, 4 and 5 downwardly along frame 2 on the tracks formed by members 9 and 12.

Carriage 3 will move downwardly along ramps 23 and 24 causing pads 44 to move automatically downwardly from the boat hull without any sliding and abrasive movement taking place between the pads and boat hull. The boat stern will be supported by the water and/or rear frame roll 31. Carriage 4 next will move downwardly and pads 44 will disengage the boat hull upon carriage 4 descending ramps 23 and 24 (FIG. 9) in the same manner as carriage 3.

Finally, pads 63 of front carriage 5 will disengage the boat bow upon rear rollers 56 of carriage 5 moving downwardly along ramps 23 (FIG. 8). Boat B then in the position shown in FIG. 8, will be largely supported by the water with the front boat portion held against pad 76 by cable 75. Winch 73 then is operated permitting the remaining portion of boat B to slide gently over roll 31 and completely into the water.

Cable 75 of winch assembly 73 then may be disconnected from the bow hook 80 at which position the boat will be floating freely in the water. Thus, carriages 3, 4 and 5 carry boat B into the water, and upon the respective carriage rollers 39 and 56 moving along the ramp formations 23 and 24 of the frame tracks, carriages 3-5 will automatically disengage their supporting contact with the boat hull. The downward movement of the support pads, as the carriages move down ramps 23 and 24, will greatly reduce the possibility of scratching, marring or damaging the boat's hull as with many prior boat trailer constructions which have supporting rollers which slidably engage the boat'S hull.

Frame 2 then may be pivoted downwardly in the direction of arrow A (FIG. 10) and latched to drawbar 6 for movement to a parking lot or the like, while the boat is in use.

The improved boat trailer construction 1 has a number of advantageous features. The traveling carriages "lift" and "deposit" a boat from and into the water during loading and launching procedures, thereby reducing considerably the possibility of damage to the hull. Only the boat's keel slidably engages any rollers or stationary frame components. The keel is more able to absorb such sliding forces than the side portions of the hull which are encountered by rollers of prior trailer constructions.

Another advantage is the stability and rigidity of the carriages, in that the rear and intermediate carriages are supported, each by eight rollers transversely spaced across the frame on the outer and inner frame members. The supporting pads on the rear and intermediate carriages 3 and 4 are spaced sufficiently apart to engage the boat upwardly on the sides of the hull instead of immediately adjacent the keel. This spaced location reduces dangerous rocking of the boat when supported by the carriages. Furthermore, the boat's bow is securely held between front pads 63 and 76 by winch 73.

Another advantage is the location of drawbar 6 between inner frame members 12 which enables drawbar 6 to be aligned automatically therebetween upon pivoting closing movement of frame 2 with respect to drawbar 6. Such automatic alignment eliminates heretofore time consuming drawbar alignment and reduces sway of the trailer frame with respect to the drawbar during towing. The adjustable mounting of pads 44 and 63 and the adjustability of chains 48-51 permit trailer 1 to be adapted easily to a variety of boat sizes and hull configurations without expensive modifications. Side straps 79 provide additional stability to the boat during storage and transit.

Improved trailer 1, likewise provides a construction which is effective, safe, and efficient in assembly, operation and use, and which achieves all the enumerated objectives, provides for eliminating difficulties encountered with prior devices, and solves problems and obtains new results in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved boat trailer construction is constructed, assembled and operated, the characteristics of the new construction, and the advantageous, new and useful results obtained; the new and useful structures, devices, elements, arrangements, parts, and combinations are set forth in the appended claims.

I claim:

1. A boat trailer construction including frame means; a pair of spaced wheel mounted on the frame means for movement of the trailer along the ground; a drawbar pivotally mounted on the frame means and extending longitudinally forwardly from the frame means; hitch means mounted on the drawbar for attaching the drawbar to a towing vehicle; the frame means including a pair of spaced, parallel, longitudinally extending outer channel members, and a pair of spaced, parallel, longitudinally extending inner channel members, said inner channel members being parallel with said outer channel members; ramp means formed on the outer and inner channel members; said ramp means being formed in the rear end portions of said channel members and aligning transversely with respect to each other; first carriage means mounted on the inner pair of channel members including boat receiving cradle means, means for securing a boat onto the cradle means, and a plurality of first rollers mounted on the first carriage means for movement of said carriage means along the inner channel members; at least second carriage means movably mounted on the inner and outer pairs of channel members; said second carriage means including a pair of subcarriages, each of said subcarriage having a pair of axles extending transversely between one of the inner channel members and the adjacent outer channel member; a plurality of second rollers being rotatably journaled on the ends of said axles engageable with the inner and outer channel members for moving said second carriage means along the channel members; a support channel being mounted on and extending upwardly from the subcarriage axles; a platform extending transversely across and spaced above the frame means and mounted on the support channels; boat supporting pad means extending upwardly from the ends of the platform; chain means extending between the first and second carriage means; and winch means mounted on the frame means operatively connected to the first carriage means for longitudinally moving all of the carriage means forwardly along the frame means by successively tensioning the chain means between said carriage means whereby the carriage means successively engage a boat floating in the water and lift the boat upwardly upon movement of the carriage means upwardly along the ramp formations.

2. The construction defined in claim 1 in which third carriage means which is similar to the second carriage means is movably mounted on the inner and outer channel members rearwardly of said second carriage means; and in which second chain means operatively connect said second and third carriage means.

3. The construction defined in claim 1 in which a plurality of brackets are mounted on the outer channel members; and in which strap means extending from a boat mounted on the carriage means are adapted to be connected to said bracket means.

4. The construction defined in claim 1 in which the drawbar is channel shaped and has front and rear ends; in which the drawbar rear end is pivotally mounted between the inner channel frame members intermediate the ends of said inner frame members; and in which latch means are mounted on the drawbar front end for releasably connecting the drawbar front end to the frame means.

5. The construction defined in claim 1 in which the first carriage means is supported on the inner channel members by four rollers; and in which the second carriage means is supported by eight rollers on the inner and outer channel members.

6. The construction defined in claim 1 in which a resilient roll is mounted on and spaced above the frame means; and in which said roll extends transversely across the rear end portion of said frame means.

7. The construction defined in claim 1 in which the chain means and the pad means of the second carriage means are adjustable whereby boats of various configurations and sizes may be mounted on the first and second carriage means.

8. A boat trailer construction including frame means; a pair of spaced wheels mounted on the frame means for movement of the trailer along the ground; a drawbar pivotally mounted on the frame means and extending longitudinally forwardly from the frame means; hitch means mounted on the drawbar for attaching the drawbar to a towing vehicle; the frame means including a pair of spaced, parallel, longitudinally extending outer channel members, and a pair of spaced, parallel, longitudinally extending inner channel members, said inner channel members being parallel with said outer channel members; ramp means formed on the outer and inner channel members; said ramp means being formed in the rear end portions of said channel members and aligning transversely with respect to each other; first carriage means mounted on the inner pair of channel members including boat receiving cradle means, means for securing a boat onto the cradle means, and a plurality of first rollers mounted on the first carriage means for movement of said carriage means along the inner channel members; at least second carriage means movably mounted on the inner and outer pairs of channel members; said second carriage means including a pair of transversely spaced subcarriages, each subcarriage having axle means extending transversely between one of the inner channel members and the adjacent outer channel member; a plurality of second rollers rotatably journaled on the ends of the axle means engageable with the inner and outer channel members for moving the second carriage means along the channel members; means mounted on the subcarriages extending transversely across and spaced above the frame means rigidly connecting together said subcarriages; pad means mounted on the ends of the transverse subcarriage connecting means for supporting a boat; chain means extending between the first and second carriage means; and winch means mounted on the frame means operatively connected to the first carriage means for longitudinally moving all of the carriage means forwardly along the frame means by successively tensioning the chain means between said carriage means whereby the carriage means successively engage a boat floating in the water and lift the boat upwardly upon movement of the carriage means upwardly along the ramp formation.

9. The construction defined in claim 8 in which the transverse subcarriage connecting means includes a transversely extending platform, and a pair of support channels, one of which is located between each of the inner and outer channel members; in which the axle means includes two pairs of axles, a pair of said axles movably mounting each support channel on the inner and outer frame channel members; in which the platform is mounted on the subcarriage support channels; and in which the pad means are mounted on the ends of the platform.

* * * * *